United States Patent
Behnke

(10) Patent No.: US 8,086,378 B2
(45) Date of Patent: Dec. 27, 2011

(54) METHOD FOR MONITORING THE QUALITY OF CROP MATERIAL

(75) Inventor: Willi Behnke, Steinhagen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 510 days.

(21) Appl. No.: 12/257,484

(22) Filed: Oct. 24, 2008

(65) Prior Publication Data

US 2009/0125197 A1 May 14, 2009

(30) Foreign Application Priority Data

Nov. 10, 2007 (DE) .................. 10 2007 053 662

(51) Int. Cl.
G06F 7/70 (2006.01)
(52) U.S. Cl. ..... 701/50; 348/120; 56/10.2 R; 56/10.2 C; 56/10.2 J
(58) Field of Classification Search .............. 701/50; 56/10.2 R, 10.2 C, 10.2 J; 382/110
See application file for complete search history.

(56) References Cited

U.S. PATENT DOCUMENTS

| 4,735,323 | A | * | 4/1988 | Okada et al. | 209/582 |
| 4,741,042 | A | * | 4/1988 | Throop et al. | 382/110 |
| 5,703,784 | A | * | 12/1997 | Pearson | 700/223 |
| 6,009,186 | A | * | 12/1999 | Gorretta et al. | 382/110 |
| 6,097,425 | A | * | 8/2000 | Behnke et al. | 348/89 |
| 6,119,442 | A | * | 9/2000 | Hale | 56/10.2 H |
| 7,190,813 | B2 | * | 3/2007 | Daley et al. | 382/110 |
| 2004/0091135 | A1 | * | 5/2004 | Bourg et al. | 382/110 |
| 2004/0136569 | A1 | * | 7/2004 | Daley et al. | 382/110 |
| 2006/0191251 | A1 | * | 8/2006 | Pirro et al. | 56/60 |
| 2007/0056258 | A1 | | 3/2007 | Behnke | |
| 2010/0071329 | A1 | * | 3/2010 | Hindryckx et al. | 56/10.2 R |

FOREIGN PATENT DOCUMENTS

| DE | 197 20 121 | 1/1998 |
| EP | 1 763 988 | 3/2007 |

* cited by examiner

*Primary Examiner* — Michael Carone
*Assistant Examiner* — Samir Abdosh
(74) *Attorney, Agent, or Firm* — Michael J. Striker

(57) ABSTRACT

A method for estimating a portion of undesired particles in crop material includes taking a photograph of the crop material; identifying images of at least one type of undesired particle in the photograph that was taken; measuring the surface area covered by the image of every particle shown in the photograph; and determining the portion of undesired particles as a proportion of the surface area of the images, and may be used, in particular, in a harvesting machine on the crop material picked up in an on-going harvesting operation.

11 Claims, 3 Drawing Sheets

Short-straw detection | 2 |
Husk detection | off |
Broken-grain detection | 1 |

☐ Gray value filter
☒ Edge detection   min. length   30
☒ Surface-area detection   min. length   100

METHOD FOR MONITORING THE QUALITY OF CROP MATERIAL

CROSS-REFERENCE TO RELATED APPLICATION

The invention described and claimed hereinbelow is also described in German Patent Application DE 10 2007 053 662.5 filed on Nov. 10, 2007. This German Patent Application, whose subject matter is incorporated here by reference, provides the basis for a claim of priority of invention under 35 U.S.C. 119(a)-(d).

BACKGROUND OF THE INVENTION

The present invention relates to a method for estimating the portion of undesired particles in crop material.

The quality, in particular the purity of a crop material such as grain, is a decisive factor in determining the type of further processing to carry out, and is therefore also a decisive factor for the price that the farmer may obtain for the crop material. The purchaser of the crop material generally defines limiting values for the portion of undesired particles in the crop material, that is, the purchase price drops if the portion of undesired particles in the crop material exceeds these limiting values.

The manner in which the crop material is harvested has a substantial effect on the quantity of undesired components contained therein. With a combine harvester, for instance, when the threshing mechanism setting is too acute, a high percentage of damaged grain results, which is undesired, because this has a negative effect on the durability of the grain. If the setting is too gentle, grains that have not been fully threshed enter the crop material, and this interferes with the further processing of the grain. Husks and short straw that enter the crop-material flow during threshing may indeed be removed in a wind separator located downstream of a threshing stage, although a setting of the wind separator that is too acute may also result in grain losses. It is therefore very important to the farmer that it be possible to reliably meet the requirements he set in terms of the quality of the crop material, but also to avoid crop-material losses that are not required to remain within the specified level of quality.

It is therefore desirable to be able to evaluate the quality of the crop material during the harvesting process itself, in order to implement measures required to attain the level of quality required, or to avoid unnecessary losses.

Publication EP 1 763 988 A1 makes known a method for adjusting a working unit of a harvesting machine, with which photographs are taken of a crop-material flow. An operator of the harvesting machine may use these photographs, in particular by comparing them with stored reference photographs, to evaluate the level of contamination of the crop material and to change the operating parameters of the harvesting machine if necessary, in order to improve the quality of the crop material or to reduce crop-material losses.

The conventional method that the operator of the machine uses to evaluate the crop-material quality is not entirely objective, however, and the efficacy of the method depends greatly on the amount of attention that the operator is able to devote to managing the crop-material quality. This amount of attention is generally not very high, since the operator is simultaneously occupied with controlling the harvesting machine.

DE 197 20 121 C2 discloses a method for performing a quantitative determination of undesired components such as leaves and dirt in sugar beets or spoiled pieces of fruit among harvested wine grapes, with which color photographs are taken of the crop material, color histograms of these photographs are created, and the portion of undesired components in the crop material is deduced based on the portion of color values in the histograms that are assigned to the undesired components. In order to deliver reliable results, a method of this type requires that the color differences between desired and undesired portions of the crop material be distinct.

Since the method is incapable of distinguishing between the image of an unattached, well-illuminated but dark object and an image of an object that is light per se but that is located in the shadow of other objects, a measurement performed using this method unavoidably contains a significant background signal. This is acceptable when the method is used by the purchaser of the crop material, since, in order to evaluate the price to be paid, the operator need only verify that the specified limiting values for the purity of the crop material have been met, and he does not have to determine the extent to which they may have been fallen below.

This is what makes the method made known in DE 197 20 121 C2 essentially unusable for the producer of the crop material.

SUMMARY OF THE INVENTION

The object of the present invention is to eliminate the disadvantages of the related art and, in particular, to provide a method with lower background noise for evaluating the crop-material quality which enables the producer to ensure a desired level of quality of the crop material without excessively acute settings of his harvesting machine resulting in unnecessary losses of crop material.

This objective is attained according to the present invention via a method for estimating the portion of undesired particles in crop material, which includes the following steps:

a) Take a photograph of the crop material;

b) Identify images of at least one class of undesired particle in the photograph that was taken;

c) Measure the surface area covered by the image of every particle shown in the photograph;

d) Determine the portion of undesired particles in proportion to the surface area of their images.

While, when creating a conventional histogram, it must be decided with regard for every individual image point—without consideration for the points adjacent to it—whether its color value corresponds to that of an undesired particle, with the result being that color deviations caused by different lighting conditions and shading may not be taken into consideration, the identification of images of undesired particles includes an evaluation that is not limited to image pixels, but that also takes into consideration the information provided by the adjacent pixels. For instance, patterns with localized extensions, which typically occur in images of certain classes of undesired particles, are recognized and taken into consideration. The measurement of the surface area of the image of a particle captured in this manner provides information about its size and, indirectly, about its mass. The portion of these particles in the crop material may therefore be quantified based on the portion of these images of undesired particles in the surface area of the photograph.

The latter step is advantageously carried out by multiplying the surface area measured by a correction factor. This correction factor, which is typically determined empirically, takes into account various characteristics of undesired particles, e.g., the tendency of specifically lightweight and large particles to accumulate on the surface of a moving crop-material flow, the fact that broken kernels—which represent an important class of undesired particles in kernel-based crop material such as grain—are recognizable as such only when they are oriented in a certain manner, etc.

Advantageously, in a further method step e), the images—taken in step c)—of undesired particles in the photograph are characterized, and the photograph obtained in this manner is displayed. This makes it possible for a user to check the quality of a measurement—i.e., the completeness of the detection of undesired particles—at any time. In the simplest case, the operator may utilize the information obtained in this manner by assuming that the portion of undesired particles is greater than what was detected when he recognizes that not all undesired particles are identified in step b), or by assuming that the portion of undesired particles is lower, if desired particles are incorrectly identified in step d) as being undesired. When the identification carried out in step b) is based on at least one adjustable parameter, the method preferably also includes the step of accepting a value of the parameter selected by a user. This makes it possible for the user to influence the detection of undesired particles and to optimize the accuracy of detection.

If the user has changed an adjustable parameter of this type, steps c) and e) are advantageously repeated on the same photograph that was taken, thereby enabling the user to immediately evaluate the consequences of the change he made. The user therefore need not understand the significance of the adjustable parameters in order to recognize the undesired particles; he may optimize the detection process simply via trial and error.

If the portion of images of undesired components determined in step d) exceeds a limiting value, a warning signal is advantageously generated to prompt the user to adjust the parameters for processing the crop material and to therefore improve it.

According to a refinement of the method, these parameters may also be adjusted automatically.

In order to even out statistical fluctuations, step e) is advantageously carried out for several photographs at the same time. The reason that several photographs are processed at the same time may be, e.g., that several photographs are combined into one photograph with a multiple of the surface area, and the method steps starting with step b) are carried out on the combined photograph. As an alternative, steps b) through d) may also be carried out separately for each photograph, then the mean of the portions that are identified is calculated.

The proposed method is particularly suited for use in monitoring a crop-material flow in a harvesting machine, e.g., a combine harvester.

One class of undesired particles may be damaged grain, as mentioned above. The image of a damaged grain of this type is identified in the photograph as a light zone. The light zone is the broken endosperm, while the surrounding shell of the grain is generally darker. To make it possible to distinguish damaged grain from particles of other types and/or illumination artefacts, the light zone is advantageously identified as damaged grain when its extension lies within a specified range.

In general, it may be stated that, according to a preferred embodiment and, in particular, when the objective is to identify undesired particles that differ from the desired crop material in terms of their lightness (in one or more spectral ranges), the photograph is preferably segmented by region, and a decision is made based on the lightness of every individual region as to whether it is the image of an undesired particle or not.

When one class of undesired particles is short straw, it may always be identified in step b) when the extension of a zone in the photograph in a longitudinal direction lies within a first value range, and when the extension in a transverse direction lies within another, second value range.

In general, to identify undesired particles that differ from the desired crop material more in terms of their shape than their lightness or color, the photograph is advantageously segmented by edge, and a decision is made based on the length of each edge obtained as to whether it is an undesired particle or not.

The object of the present invention is also a computer program with program code means for carrying out the steps of a method as described above on a computer that is coupled with a camera, and a computer program product with program code means stored on a computer-readable data storage device in order to carry out the method described above on a computer that is coupled with a camera.

A further object of the present invention is the computer itself that is coupled with a camera and is programmed to carry out the method, in particular when it is installed in a harvesting machine, and when the camera is positioned to take photographs of a crop-material flow in the harvesting machine.

A computer of this type may also be programmed to control parameters of the processing of the crop material in the harvesting machine based on the portion of undesired particles that was determined.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
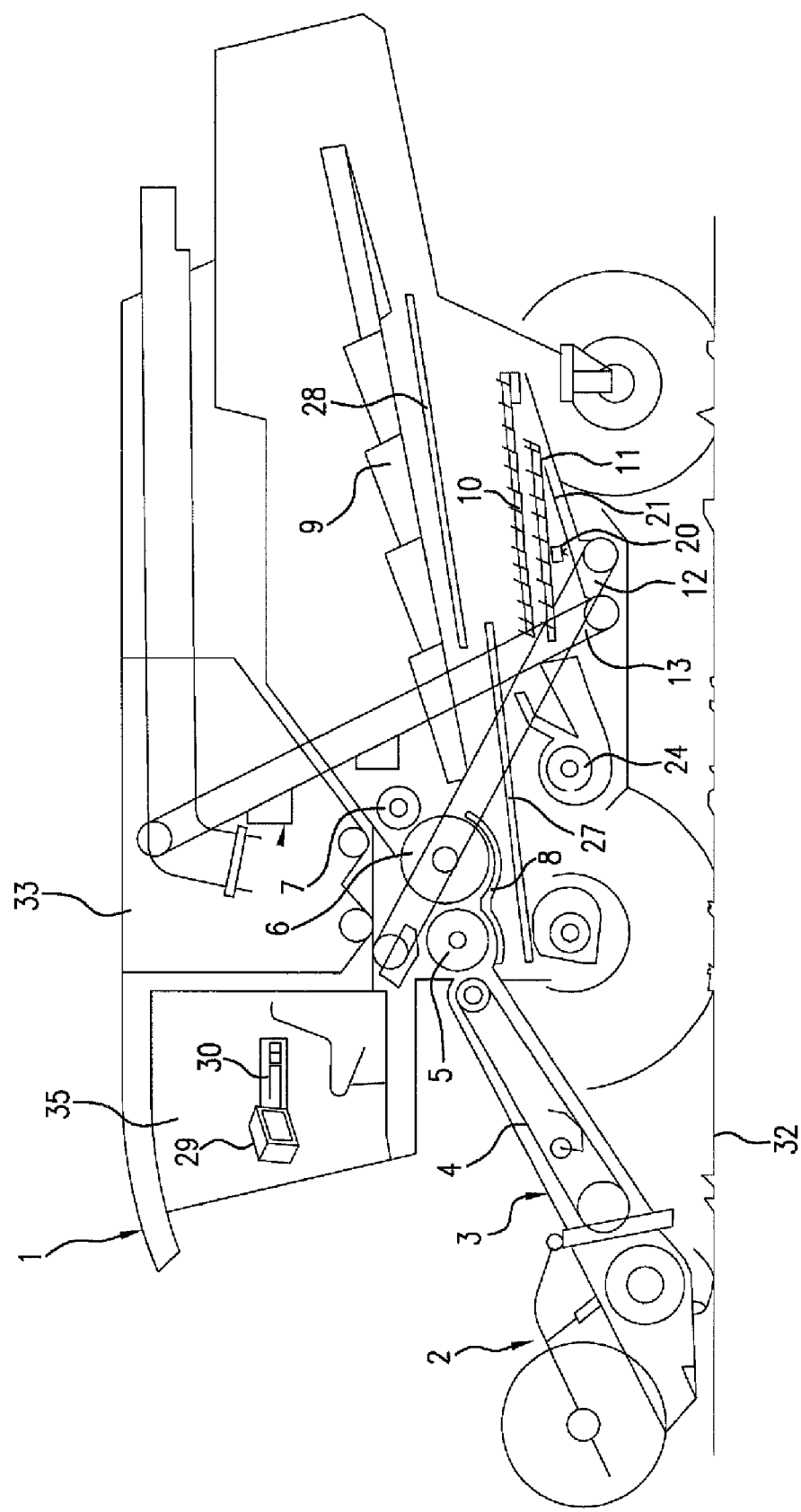
FIG. 1 shows an agricultural working machine in a schematic side view of a combine harvester.

FIG. 1 shows a schematic side view of a combine harvester 1. A grain-cutting device 2 is used to cut and pick up grain stalks from a field 32 and to convey them to a feeder 3. Rotating feed chains 4 are located inside feeder 3. Feed chains 4 include cross braces that convey the crop material to downstream threshing units 5, 6. The crop material is removed by a preacceleration cylinder 5 at the end of feeder 3 and is accelerated around the circumference of preacceleration cylinder 5 between preacceleration cylinder 5 and a concave 8. The accelerated crop material is transferred to cylinder 6 and is accelerated further. The crop material is separated from the ears and straw via the striking and rubbing effect of preacceleration cylinder 5 and cylinder 6, and via the centrifugal force acting on the crop material. The crop material then travels through concave 8, which allows the crop material to pass, and reaches grain pan 27. The straw output by cylinder 6 is redirected via impeller 7 to several shakers 9 located next to each other across the working width. The oscillating motion of shakers 9 and their stepped design cause the straw to be conveyed to the back end of the combine harvester, thereby removing any crop material remaining in the straw. This remaining quantity is also transferred to grain pan 27, via an oscillating return pan 28.

The crop material with the remaining admixtures, e.g., straw pieces, chaff and ear pieces, located on grain pan 27 is separated via an oscillating motion of grain pan 27 and its stepped design, and is conveyed to downstream cleaning units, an upper sieve 10, and a lower sieve 11. The transfer to upper sieve 10 takes place via a straw walker step 34, which is ventilated by a cleaning fan 24. Upper sieve 10 and lower sieve 11 located beneath it are usually chaffers with opening widths that may be adjusted separately. A flow of air created by cleaning fan 24 passes through upper sieve 10 and lower sieve 11. The oscillating motion of sieves 10, 11 and the air flow cause the crop material and its admixtures to be directed toward the back end of the harvesting machine. By way of straw walker step 34, large and lightweight admixtures are captured by the air flow before they reach upper sieve 10 and are ejected out of combine harvester 1.

Smaller and heavier crop components travel from grain pan 27 via straw walker step 34 to upper sieve 10. Depending on the setting of the upper sieve width, the individual crop grains and further components of the crop material fall through it, thereby reaching lower sieve 11. Straw and non-threshed-out ears are moved past the front sieve area and, in the rear region of upper sieve 10, fall through upper sieve 10 directly into the "tailings". Lower sieve 11 typically has a finer plate structure than does upper sieve 10, and is normally set with a smaller opening width than is upper sieve 10. Larger and lighter-weight crop components, such as crop grains with husks, ear parts, or stalk parts—provided they have traveled through upper sieve 10 and reached lower sieve 11—are transferred via the oscillating motion and air flow into the tailings. The cleaned crop material itself falls directly through lower sieve 11 and is conveyed to grain tank 33 using a feed auger and grain elevator 13.

A camera 20 and a light source for illuminating the viewing field of camera 20 are located in a suitable location upstream of lower sieve 11 and on the path traveled by the grain. They may be located, e.g., on lower sieve 11, and they may be oriented toward a bottom tray 21, which extends underneath lower sieve 11 and slants downward toward grain elevator 13, to provide photographs of the crop material flowing over it. It is also feasible to place them on grain elevator 13 itself.

The crop material that reaches the tailings is returned to the threshing process via a feed auger and tailings elevator 12 located above preacceleration cylinder 5.

Combine harvester 1 is equipped with a driver's cab 35, in which a control and monitoring device 29 is located, which serves as a user interface of a fieldwork computer 30.

Figure 2:
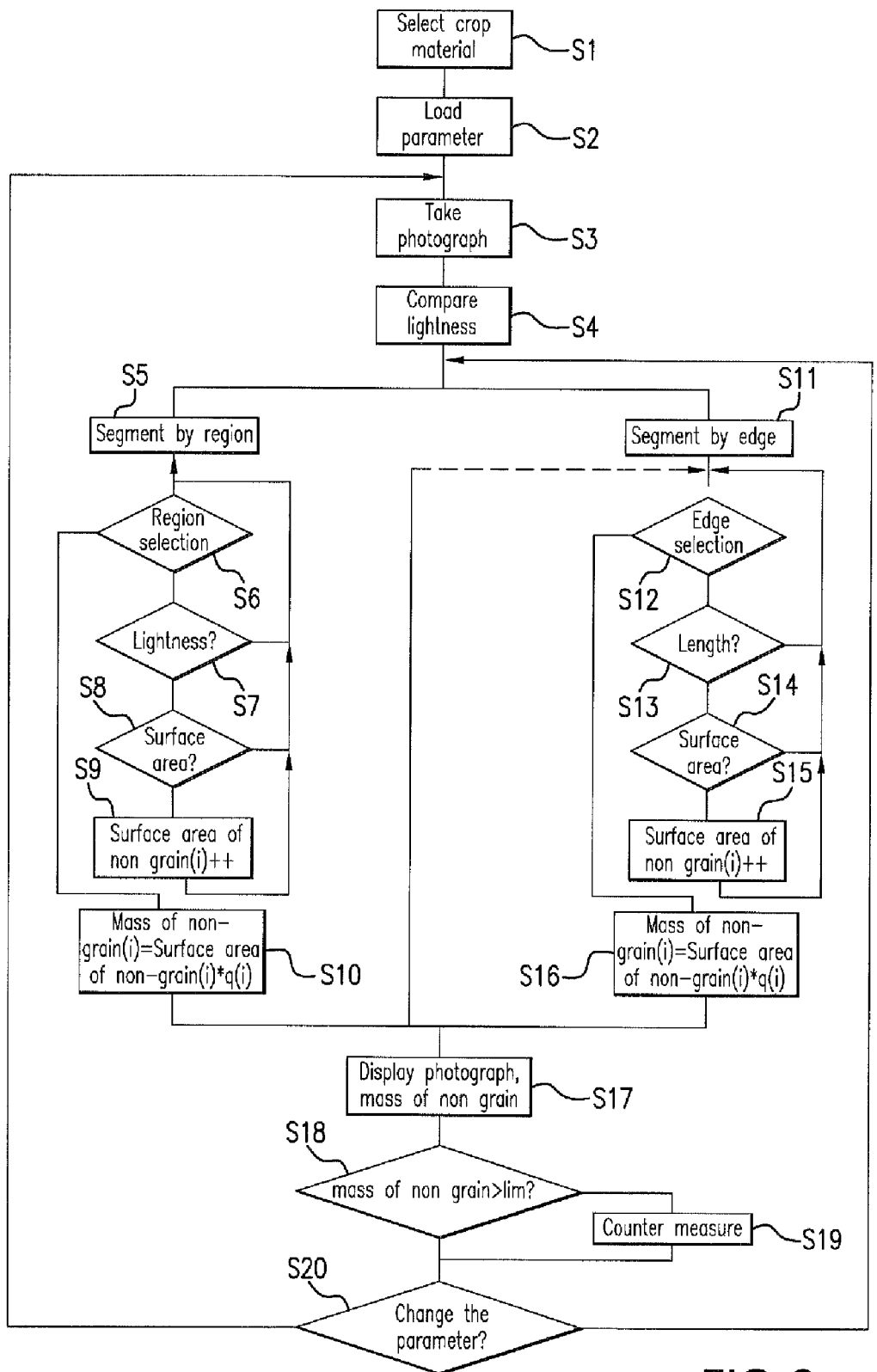
FIG. 2 shows a flow chart of a program run by a fieldwork computer of the combine harvester to monitor the quality of the crop material.

FIG. 2 shows a flow chart of a procedure carried out by fieldwork computer 30, which is coupled to camera 20.

At the beginning of every harvesting process, fieldwork computer 30 prompts the driver—in step S1—to select the type of crop material. Fieldwork computer 30 includes a database of the parameter records for various possible crop materials required for the process to be described below. This database is preloaded by the manufacturer of the combine harvester with suitable parameter values for various types of crop material, although the user may edit it as necessary, in order to make adjustments. According to a preferred embodiment, the parameters loaded in step S2 include parameters that relate to the evaluation—to be described in greater detail below—of photographs provided by camera 20, and settings for the threshing and cleaning step of combine harvester 1, e.g., cylinder speeds, sieve mesh widths, fan throughput, etc., which affect the quality and cleanliness of the resultant crop material, and which may be set by fieldwork computer 30 with the aid of suitable actuators (not shown) involved in the threshing and cleaning steps. These parameter values are generally defined such that, under normal working conditions, a good quality of crop-material flow is obtained at the location of camera 20.

According to a simpler design, the parameters loaded in step S2 relate only to the evaluation—by fieldwork computer 30—of photographs taken by camera 20, and it is up to the driver to enter the settings for the threshing and cleaning step in advance depending on the particular crop material being processed.

As soon as a constant flow of crop material begins passing by camera 20, fieldwork computer 30 prompts camera 20—in step S3—to take a photograph of this crop material. In preparation for the image processing in a narrower sense, a lightness comparison is carried out on this photograph, in step S4, i.e., regions of the photograph that have an extension that is clearly greater than that of a particle of the desired crop material and that are lighter or darker than a mean of the photograph that was taken are darkened or lightened in a computer-assisted manner, in order to compensate for fluctuations in lightness that result, e.g., from localized different layer thicknesses of the crop material—and, therefore, different distances between them and the light source—or from local shadows.

The photograph obtained in this manner is then segmented. The segmentation may be based on region or edge. If fieldwork computer 30 has enough computing power, various segmentations may also be carried out on the same photograph. Region-based segmentation S5 will be considered first. In a segmenting process such as this, the photograph is dissected into a large number of regions, each of which is characterized by a lightness or color value that distinguishes it from adjacent regions and justifies the assumption that exactly one object is shown in the region. Methods used to perform region-based segmenting are known by the keywords of region growing, region splitting, pyramid linking, and split and merge, and they will not be discussed in detail here.

After the segmenting is carried out, a region of the photograph is selected in step 6, and a check is carried out in step 7 to determine whether its lightness differs from a target value or a mean of the photograph by enough that the region under investigation could be, e.g., the image of the broken surface of a grain. If it is not, a new region is selected in step S6. When the lightness is sufficiently different, the method jumps to step S8, in which the surface area of the particular region is determined, e.g., by counting the number of image pixels in it. The surface area determined in this manner is added—in step S9—to an NKFläche(i) counter value, which was set to zero in step S5. This counter value is a measure of the portion of images of non-grain material of an "ith" type, e.g., the broken surfaces of damaged grain in this case, in the surface of the photograph. Steps S7 through S9 may then be repeated, based on detection parameters for non-grain material of other types.

In step S6, a new region is selected. This process is continued until all regions have been processed. The method then jumps to step S10, in which the counter value NKFläche(i) is multiplied by a correction factor q(i) that is specific to the type of crop material and non-grain material, in order to obtain an estimated value for the portion NKMasse(i) of damaged grain to the total mass of crop material. The correction factor q(i) is an empirical quantity that belongs to the parameters loaded in step S2.

A further important class of undesired particles besides damaged grain is short straw. Its color or lightness is not substantially different from that of grains. As such, it is preferable to use edge-oriented segmentation (S11) to identify it. To minimize the amount of computer power required of fieldwork computer 30, it is also possible—as indicated via a dashed arrow line in the flow chart—to eliminate the edge-oriented segmentation by defining the limits of the regions identified in step S5 as edges.

An edge obtained in this manner is selected in step S12, and its length is evaluated in step S13. If the length is below a specified limiting value, it is assumed that the edge borders the image of a grain, and the method returns to step S12, in order to select a new edge. If the edge is long enough, however, the method continues to step S14, where the surface area of the region bounded by this edge—or its width, i.e., its extension transversely to the edge under consideration—is evaluated, and, if the size is sufficient, it is assumed that the object is a piece of short straw. Its surface area is added, in step S15, to a counter value NKFläche (j), which was also set to zero in the segmentation process. Further edges of the accumulated surface area are deleted from the quantity of edges that have yet to be processed and which may be selected in step S12, to ensure that the same piece of straw will not be counted more than once.

After all edges have been processed in this manner, the mass fraction NKMasse(j) of the short straw is calculated in step S16 by multiplying the surface area counter value NKFläche (j) by a related correction factor q(j).

In step S17, fieldwork computer 30 displays the photograph obtained in step S3 in which all regions in the photograph that were identified as images of non-grain components are emphasized, and by displaying the calculated mass fractions NKMasse (i) of the damaged grain and NKMasse (j) of the short straw on a screen of control/monitoring device 29. The driver is thereby informed about the current quality of the crop material, and he is able to verify the quality of the evaluation by checking to determine whether all characterized regions in the photograph actually contain non-grain components and whether all non-grain components that he sees in the photograph have also been detected by fieldwork computer 30.

In step S18, fieldwork computer 30 checks to determine whether the portion of one of these monitored non-grain components exceeds a specified limiting value. If so, a counter-measure is taken in step S19. The counter-measure may be that fieldwork computer 30 itself selects an operating parameter of the threshing and/or cleaning step that influences the particular non-grain material fraction, and adjusts it in order to reduce the portion of non-grain material. As an alternative, the counter-measure taken in step S19 may be limited to sending the driver a warning to prompt him to make the necessary parameter adjustments himself.

If the driver determines—based on the photograph displayed in step S17—that the rate of detection errors is significant, he will modify—using control/monitoring device 29—one or another of the parameter limiting values investigated in steps S7, S8, S13, S14. If this takes place, the method returns from step S20 to the segmentation of step S5 or S11 and repeats them and the identification of the non-grain particles based on the same photograph. When the processed photograph is displayed once more, in step S17, the driver can see immediately whether the detection of non-grain particles has improved or become worse, thereby allowing him to retain or discard the parameter change accordingly.

Figure 3:
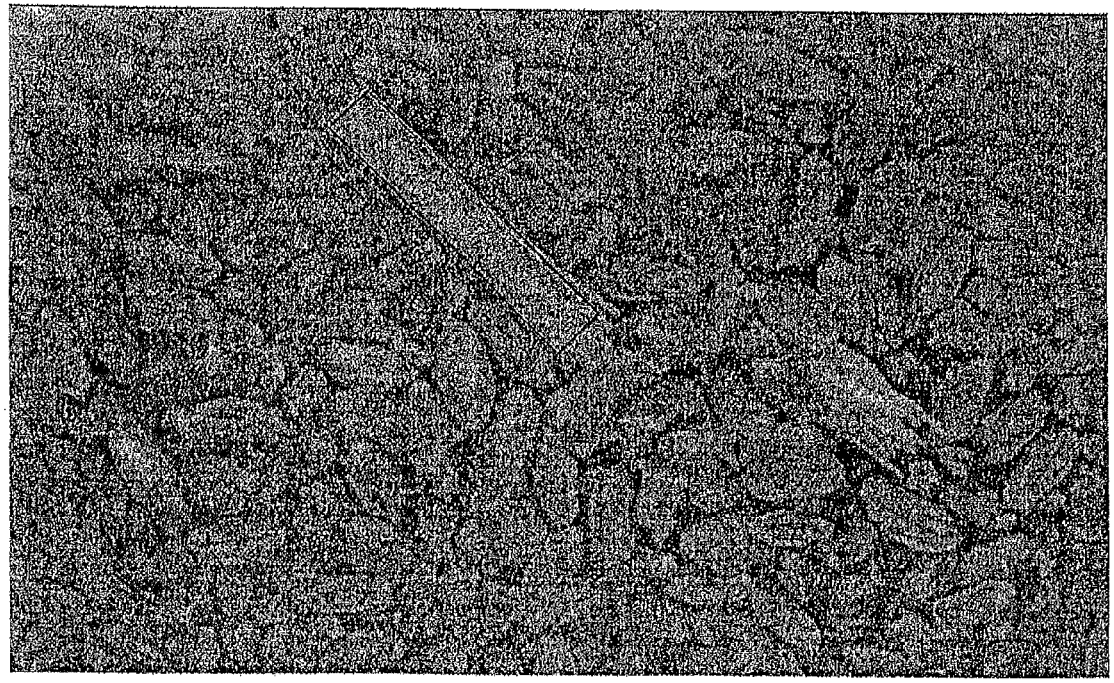
FIG. 3 shows an example of a photograph displayed by the computer on a screen in the driver's cab of the combine harvester.

FIG. 3 shows an example of the image that is displayed on the screen of control and monitoring device 29. A text region in the upper part of the screen shows types of detectable non-grain material: damaged grain, husks, and short straw. The driver may fill dialog fields 36 located next to the type descriptions with values 0, 1, 2, which represent the operating modes of "detection deactivated", "activated detection with stored detection parameters", and "change detection parameters". For the non-grain material type "short straw", the mode "change detection parameters" is activated, and the parameters length and surface area—which may be changed—are displayed, along with their current values.

A photograph taken by camera 20 is displayed in the lower region of the screen. A piece of straw that is detected in the photograph is emphasized by a border 37 that is drawn around it.

It will be understood that each of the elements described above, or two or more together, may also find a useful application in other types of methods and constructions differing from the types described above.

While the invention has been illustrated and described as embodied in a method for monitoring the quality of crop material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for estimating a portion of undesired particles in crop material, comprising the steps of taking a photograph of the crop material; identifying images of at least one type of undesired particle in the photograph that was taken; measuring a surface area covered by the image of every particle shown in the photograph; and determining a portion of undesired particles in proportion to the surface area of the images, and wherein said taking a photograph of the crop material includes taking the photograph of a crop material flow in a harvesting machine.

2. A method as defined in claim 1, wherein said determining includes multiplying the surface area that is determined by a correction factor, in order to determine a portion of foreign objects expressed as a ratio of mass of foreign objects to a mass of crop material.

3. The method as defined in claim 1, further comprising characterizing images, taken during said measuring, of undesired particles in the photograph, and displaying the photograph obtained in this manner.

4. The method as defined in claim 1, further comprising performing said identifying based on at least one adjustable parameter, and accepting a value of the parameter selected by a user.

5. The method as defined in claim 4, further comprising, after said accepting, repeating said measuring the surface area and characterizing images of undesired particles repeated on the same photograph.

6. The method as defined in claim 1, further comprising generating a warning signal when the portion that is determined exceeds a limiting value.

7. The method as defined in claim 3, further comprising carrying out said characterizing images and displaying the photograph for several photographs at once.

8. A method for estimating a portion of undesired particles in crop material, comprising the steps of taking a photograph of the crop material; identifying images of at least one type of undesired particle in the photograph that was taken; measuring a surface area covered by the image of every particle shown in the photograph; and determining a portion of undesired particles in proportion to the surface area of the images, further comprising using damaged grain as one class of undesired particles, wherein said identifying includes identifying the image of damaged grain when an extension of a light zone in the photograph lies within a specified range.

9. The method as defined in claim 1, further comprising segmenting the photograph by region, and making a decision based on a lightness of every region as to whether it is the image of an undesired particle or not.

10. A method for estimating a portion of undesired particles in crop material, comprising the steps of taking a photograph of the crop material; identifying images of at least one type of undesired particle in the photograph that was taken; measuring a surface area covered by the image of every particle shown in the photograph; and determining a portion of undesired particles in proportion to the surface area of the images, further comprising using short straw as one class of undesired particles, and in said identifying, identifying a piece of short straw when an extension of a zone in the photograph in a longitudinal direction lies within a first range, and when, in a transverse direction, it lies within another second range.

11. The method as defined in claim 1, further comprising segmenting the photograph by edge, and making a decision based on a length of an edge that is obtained as to whether it is the image of an undesired particle or not.

* * * * *